(12) United States Patent
Angus et al.

(10) Patent No.: US 9,407,635 B2
(45) Date of Patent: Aug. 2, 2016

(54) VEHICLE DATA DELIVERY

(71) Applicant: The Boeing Company, Chicago, IL (US)

(72) Inventors: Ian Gareth Angus, Mercer Island, WA (US); Olga C. Walker, Mercer Island, WA (US)

(73) Assignee: THE BOEING COMPANY, Chicago, IL (US)

( * ) Notice: Subject to any disclaimer, the term of this patent is extended or adjusted under 35 U.S.C. 154(b) by 56 days.

(21) Appl. No.: 14/279,434

(22) Filed: May 16, 2014

(65) Prior Publication Data

US 2015/0334113 A1    Nov. 19, 2015

(51) Int. Cl.
| | |
|---|---|
| *G06F 21/64* | (2013.01) |
| *H04L 29/06* | (2006.01) |
| *H04W 12/06* | (2009.01) |
| *H04L 29/08* | (2006.01) |
| *H04W 4/04* | (2009.01) |

(52) U.S. Cl.
CPC ............ *H04L 63/0876* (2013.01); *G06F 21/64* (2013.01); *H04L 63/0428* (2013.01); *H04L 63/08* (2013.01); *H04L 63/126* (2013.01); *H04L 67/12* (2013.01); *H04W 4/046* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 7,401,054 B1 * | 7/2008 | Shah et al. ....................... 705/51 |
| 7,636,568 B2 | 12/2009 | Gould et al. | |
| 8,055,393 B2 | 11/2011 | Sims, III et al. | |
| 8,442,751 B2 | 5/2013 | Kimberly et al. | |
| 2005/0086497 A1 * | 4/2005 | Nakayama ..................... 713/185 |
| 2009/0106560 A1 * | 4/2009 | Chopart ......................... 713/189 |
| 2009/0138516 A1 * | 5/2009 | Young et al. ................ 707/104.1 |
| 2009/0138517 A1 * | 5/2009 | McLain et al. .............. 707/104.1 |
| 2009/0138518 A1 * | 5/2009 | Rodgers et al. ............. 707/104.1 |
| 2009/0138873 A1 | 5/2009 | Beck et al. | |
| 2009/0138874 A1 | 5/2009 | Beck et al. | |
| 2010/0100745 A1 * | 4/2010 | Belmonte ...................... 713/176 |
| 2011/0237326 A1 * | 9/2011 | Murakami ....................... 463/29 |
| 2014/0046906 A1 * | 2/2014 | Patiejunas et al. ............ 707/661 |
| 2014/0053243 A1 | 2/2014 | Walsh et al. | |
| 2014/0337616 A1 * | 11/2014 | Kimberly ...................... 713/156 |

OTHER PUBLICATIONS

Robinson, "Electronic Distribution of Airplane Software and the Impact of Information Security on Airplane Safety", 2007, pp. 1-13.*
Kimberly et al., "Use of Multiple Digital Signatures and Quorum Rules to Verify Aircraft Information," U.S. Appl. No. 13/888,730, filed May 7, 2013, 32 pages.

(Continued)

*Primary Examiner* — Benjamin Lanier
(74) *Attorney, Agent, or Firm* — Yee & Associates, P.C.

(57) ABSTRACT

A system and method of delivering vehicle data. Reference data is received by a data processing system. The reference data comprises a reference identifying the vehicle data stored in a repository that is located off of a vehicle and reference authentication data identifying a source of the reference data. The data processing system uses the reference authentication data to determine whether the reference data is from an approved source for the reference data. The reference is used to retrieve the vehicle data from the repository by the data processing system when the reference data is determined to be from the approved source for the reference data. The vehicle data comprises authentication data identifying a source of the vehicle data. The data processing system uses the authentication data to determine whether the vehicle data is from an approved source for the vehicle data.

18 Claims, 7 Drawing Sheets

(56) References Cited

OTHER PUBLICATIONS

Angus et al., "Aircraft Configuration and Software Part Management Using a Configuration Software Part," U.S. Appl. No. 14/097,982, filed Dec. 5, 2013, 62 pages.
Extended European Search Report, dated Oct. 20, 2015, regarding Application No. EP15167770.5, 7 pages.

Olive, "Efficient Datalink Security in a Bandwidth-Limited Mobile Environment—An Overview of the Aeronautical Telecommunications Network (ATN) Security Concept," 20th Digital Avionics Systems Conference, Oct. 2001, pp. 9.E.2-1-9.E.2-10.

* cited by examiner

VEHICLE DATA DELIVERY

BACKGROUND INFORMATION

1. Field

The present disclosure relates generally to aircraft and other vehicles and in particular to data for aircraft and other vehicles. Still more particularly, the present disclosure relates to a method and apparatus for delivering data to and from an aircraft or other vehicle.

2. Background

Computer systems are used in many aircraft. For example, a computer system in a commercial passenger aircraft may include multiple computers that communicate with each other through an aircraft network. Such computers may take various forms, such as a flight management system, a navigation computer, an engine indicating and crew alerting system (EICAS), an autopilot, an electronic flight bag, and other line-replaceable units or other types of data processing systems.

Computer systems on an aircraft may use software or programming to provide the logic or control for various operations and functions. The software used in computer systems on aircraft is commonly treated as parts in the airline industry. For example, a software application for use in a line-replaceable unit on an aircraft may be tracked separately from the line-replaceable unit itself. Aircraft software that is treated as an aircraft part may be referred to as a loadable software aircraft part, an aircraft software part, or simply as a software part. A software part may be considered a separately identified part of the configuration of an aircraft, rather than part of the hardware which operates the software.

Software parts may be installed into a computer system on an aircraft at various times. For example, a software part may be installed during the manufacturing of an aircraft. Further, a software part may be installed at a later time when the aircraft is in service. A software part may be installed on an aircraft to replace an existing software part, provide a new or improved feature, or for some other suitable purpose or various combinations of purposes.

Software parts are often loaded onto a computer system on an aircraft during maintenance and service for the aircraft when the aircraft is located in a hanger or other maintenance location. However, loading software parts and other information on an aircraft may be desirable at other times. For example, without limitation, an updated version of a software part for an entertainment system on an aircraft may provide more entertainment features for passengers. It may be desirable to make these improved features available on the aircraft as soon as possible.

It also may be desirable to download information from a computer system on an aircraft to a location off of the aircraft. For example, without limitation, an airline or other operator of an aircraft may desire to move operational data from an aircraft to a location off of the aircraft for storage, analysis, or for other appropriate purposes. Such operational data may include, for example, logs, events, sensor data, and other data that may be generated by an aircraft computer system or other devices on the aircraft. It may be desirable that such data is moved from the aircraft to the location off of the aircraft in a timely and secure manner.

Therefore, it would be desirable to have a method and apparatus that take into account at least some of the issues discussed above, as well as other possible issues.

SUMMARY

An embodiment of the present disclosure provides a method of delivering vehicle data. Reference data is received by a data processing system. The reference data comprises a reference identifying the vehicle data stored in a repository that is located off of a vehicle and reference authentication data identifying a source of the reference data. The data processing system uses the reference authentication data to determine whether the reference data is from an approved source for the reference data. The data processing system uses the reference to retrieve the vehicle data from the repository when the reference data is determined to be from the approved source for the reference data. The vehicle data comprises authentication data identifying a source of the vehicle data. The data processing system uses the authentication data to determine whether the vehicle data is from an approved source for the vehicle data.

An embodiment of the present disclosure also provides an apparatus comprising a data receiver on a vehicle, a data retriever on the vehicle, a data authenticator on the vehicle, and a decrypter on the vehicle. The data receiver is configured to receive reference data. The reference data comprises a reference identifying vehicle data stored in a repository that is located off of the vehicle and reference authentication data identifying a source of the reference data. The data retriever is configured to use the reference to retrieve the vehicle data from the repository. The vehicle data comprises authentication data identifying a source of the vehicle data. The data authenticator is configured to use the reference authentication data to determine whether the reference data is from an approved source for the reference data and to use the authentication data for the vehicle data to determine whether the vehicle data is from an approved source for the vehicle data. The decrypter is configured to decrypt the vehicle data retrieved from the repository.

An embodiment of the present disclosure also provides a method of delivering aircraft data. The aircraft data is signed by a source of the aircraft data with a digital signature identifying the source of the aircraft data to provide signed aircraft data. The signed aircraft data is encrypted to provide encrypted aircraft data. The encrypted aircraft data is stored in a repository that is off of the aircraft. The repository is selected from a content delivery network and storage provided as a service on the Internet. The encrypted data stored in the repository is identified by reference data.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

Figure 1:
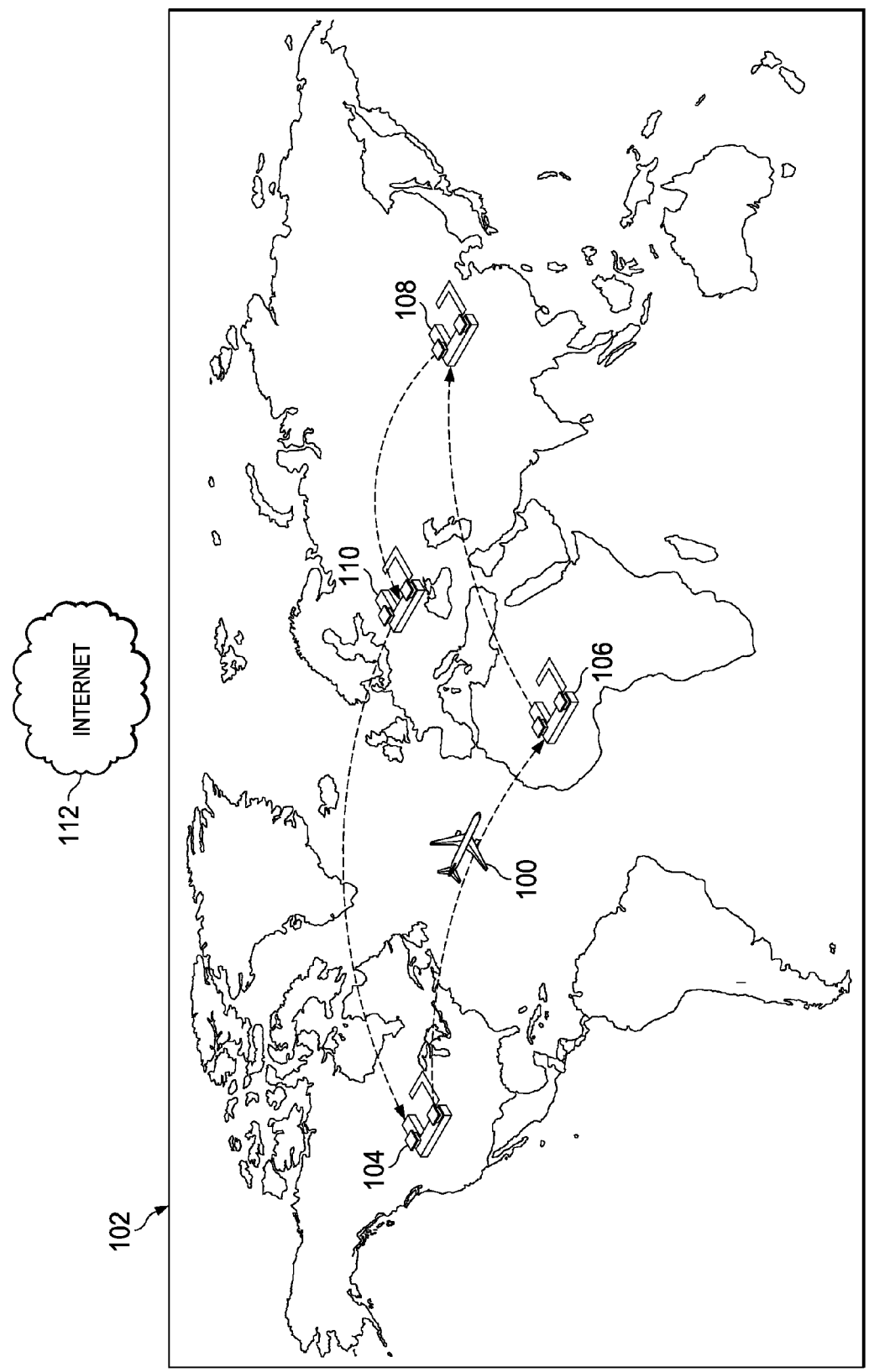
FIG. 1 is an illustration of aircraft operations in accordance with an illustrative embodiment.

The illustrative embodiments recognize and take into account a number of different considerations. "A number," as used herein with reference to items, means one or more items. For example, "a number of different considerations" are one or more different considerations.

The different illustrative embodiments recognize and take into account that airlines and other operators of aircraft may desire to send data to an aircraft, receive data from an aircraft, or both, when the aircraft is in operation at various locations throughout the world. Airlines and other aircraft operators also may desire that any data that is sent to or from an aircraft remains confidential and secure so that the integrity of such data is retained. Currently, airlines maintain the confidentiality and security of data sent to and from an aircraft by requiring direct communication of such data between the aircraft and a data processing system that is controlled by or for the airline.

The different illustrative embodiments recognize and take into account that the direct communication of data between an aircraft and a data processing system controlled by or for an airline or other aircraft operator may be limited at some locations in the world at which the aircraft may be operating. For example, the direct communication of data between an aircraft and a system controlled by or for the operator of the aircraft may suffer from low bandwidth and high latencies when the aircraft is at some locations in the world. The illustrative embodiments also recognize and take into account that the cost of a direct connection to deliver data to and from an aircraft at some locations may be more expensive than desired. For example, without limitation, airlines and other aircraft operators may use satellite links for direct communications with aircraft at some locations in the world. However, the use of satellite links for direct communications with aircraft is relatively expensive and also may be bandwidth and latency constrained.

Direct communications between an aircraft and a data processing system located off of the aircraft may be improved when the data processing system is relatively close to the aircraft. Therefore, to mitigate the limitations of direct communications with aircraft located throughout the world, an airline or other aircraft operator may own or otherwise control data processing systems and stores of data at various locations around the world. However, it may be expensive to establish and maintain such a large computing footprint at many locations around the world. Furthermore, the expense and risk associated with maintaining the physical security of such data processing systems increases as the number of locations in the world at which such systems are maintained is increased.

The illustrative embodiments recognize and take into account that one manner in which data may be delivered to and from an aircraft or other vehicle at almost any location in the world is via a worldwide network, such as the Internet. For example, the illustrative embodiments recognize and take into account that cloud computing may be used to deliver a software part or other data to an aircraft from a source that is controlled by or for an airline or other operator of the aircraft. The illustrative embodiments recognize and take into account that the use of storage on a network through cloud computing may allow for faster distribution of a software part or other data to an aircraft or other vehicle. The illustrative embodiments also recognize and take into account that sending data from an aircraft or other vehicle using cloud technologies may be beneficial. For example, the illustrative embodiments recognize and take into account that sending operational data from an aircraft or other vehicle to a location off of the aircraft or other vehicle for analysis in a timely manner may allow for quicker identification of actions that may be taken with respect to the aircraft or other vehicle. These actions may include, for example, scheduling of maintenance, identifying changes to software parts, or other suitable actions or various combinations of actions.

The illustrative embodiments recognize and take into account that ensuring the integrity, confidentiality, or both, of data that is delivered to and from an aircraft or other vehicle may be important. For example, without limitation, the illustrative embodiments recognize and take into account that reducing or eliminating the possibility of the corruption, tampering with, or other changes to software parts and other data that may be delivered to or from an aircraft or other vehicle is desirable. The illustrative embodiments recognize and take into account that rules or regulations regarding the export of technology in a software part or other data may make sending the software part or other data to the aircraft infeasible when the aircraft is at some locations in the world, unless confidentiality of the technology in the data to be delivered to the aircraft can be assured.

The illustrative embodiments recognize and take into account that the communication of data between an aircraft or other vehicle and a data processing system located off of the vehicle via the Internet using cloud computing is a form of indirect communication between the aircraft or other vehicle and the off-board data processing system. Data that is delivered to or from an aircraft or other vehicle via cloud computing may be stored in systems that are not controlled by an airline or other operator of the aircraft or other vehicle. Data that is stored in systems that are not controlled by the airline or other operator of the aircraft or other vehicle may raise concerns about the security of data that is delivered to or from an aircraft or other vehicle via the Internet using cloud computing.

The illustrative embodiments provide a system and method for delivering data to and from an aircraft or other vehicle in a timely and cost effective manner while data integrity and confidentiality are maintained. In accordance with an illustrative embodiment, the bulk of vehicle data to be delivered to or from an aircraft or other vehicle may be stored securely in a third party cloud environment with confidence that confidentiality is maintained and integrity is protected. A reference to the vehicle data stored in the third party repository, which may be much smaller than the stored vehicle data, may be passed to or from the vehicle via relatively low bandwidth communications. The reference data may be sufficient to allow many normal business processes to be executed without exposing the bulk of the potentially sensitive vehicle data.

Both the bulk of the vehicle data stored in the repository and the reference data may include sufficient integrity information to prevent tampering.

Turning to FIG. 1, an illustration of aircraft operations is depicted in accordance with an illustrative embodiment. For example, without limitation, aircraft 100 may be a commercial passenger aircraft or other appropriate type of aircraft. Aircraft 100 may be operated throughout the world 102. For example, operation of aircraft 100 may include flying various routes between locations 104, 106, 108, and 110 throughout the world 102. Aircraft 100 may be operated at more, fewer, or various different locations from those shown as examples in FIG. 1.

It may be desirable to deliver various types of data to and from aircraft 100 when aircraft 100 is in operation. For example, without limitation, it may be desirable to deliver software parts or other data to aircraft 100 to maintain or improve the operation of aircraft 100. Alternatively, or in addition, it may be desirable to deliver operational data from aircraft 100 off of aircraft 100 for analysis, storage, another appropriate use, or various combinations of uses. In any case, it may be desirable that the delivery of data to and from aircraft 100 is performed in a cost effective and timely manner and in a manner that preserves the confidentiality and integrity of the data.

It may be desirable to deliver various types of data to aircraft 100, from aircraft 100, or both, when aircraft 100 is located at any of various locations 104, 106, 108, and 110 throughout the world 102. For example, without limitation, location 104 may include facilities that are operated by or for an airline or other operator of aircraft 100. In this case, direct, secure, and relatively high speed communication of data between aircraft 100 and a data processing system controlled by or for the airline or other operator of aircraft 100 may be available when aircraft 100 is at location 104. Such communications may be used to provide for relatively fast and secure delivery of various types of data to and from aircraft 100 when aircraft is at location 104.

However, communications between aircraft 100 and the airline or other operator of aircraft 100 may be relatively limited when aircraft 100 is in operation at some of other locations 106, 108, and 110 throughout the world 102. For example, without limitation, direct communications between aircraft 100 and an airline or other operator of aircraft 100 when aircraft 100 is at some of locations 106, 108, and 110 may be unavailable, may suffer from low bandwidths or high latencies, may be relatively expensive, or may have other limitations or various combinations of limitations. Furthermore, the security of data delivered to or from aircraft 100 may be of particular concern, more difficult to provide, or both, when aircraft 100 is located at some of locations 106, 108, and 110.

The illustrative embodiments recognize and take into account that the Internet 112 is pervasive throughout the world 102. The Internet 112 is a global system of interconnected computer networks that use standard protocols to link several billion devices worldwide. The Internet 112 is a network of networks that consists of millions of private, public, academic, business, and government networks, of local and global scope, that are linked by a broad array of electronic, wireless, and optical networking technologies.

Relatively good access to the Internet 112 is likely to be available at locations 104, 106, 108, and 110 throughout the world 102. For example, aircraft 100 is likely to be able to establish a relatively high bandwidth and low latency connection to exchange data with the Internet 112 at locations 104, 106, 108, and 110 throughout the world 102. Furthermore, various providers may provide various commercial or other products and services for the storage and delivery of data via the Internet 112. Content delivery networks and data storage provided as a service on the Internet 112 are examples of such products and services.

The illustrative embodiments provide a system and method for delivering data to and from aircraft 100 at locations 104, 106, 108, and 110 throughout the world 102 via the Internet 112. In accordance with an illustrative embodiment, data may be provided to and from aircraft 100 at locations 104, 106, 108, and 110 in a timely and cost effective manner and in a manner that maintains the confidentiality and integrity of the data.

Figure 2:
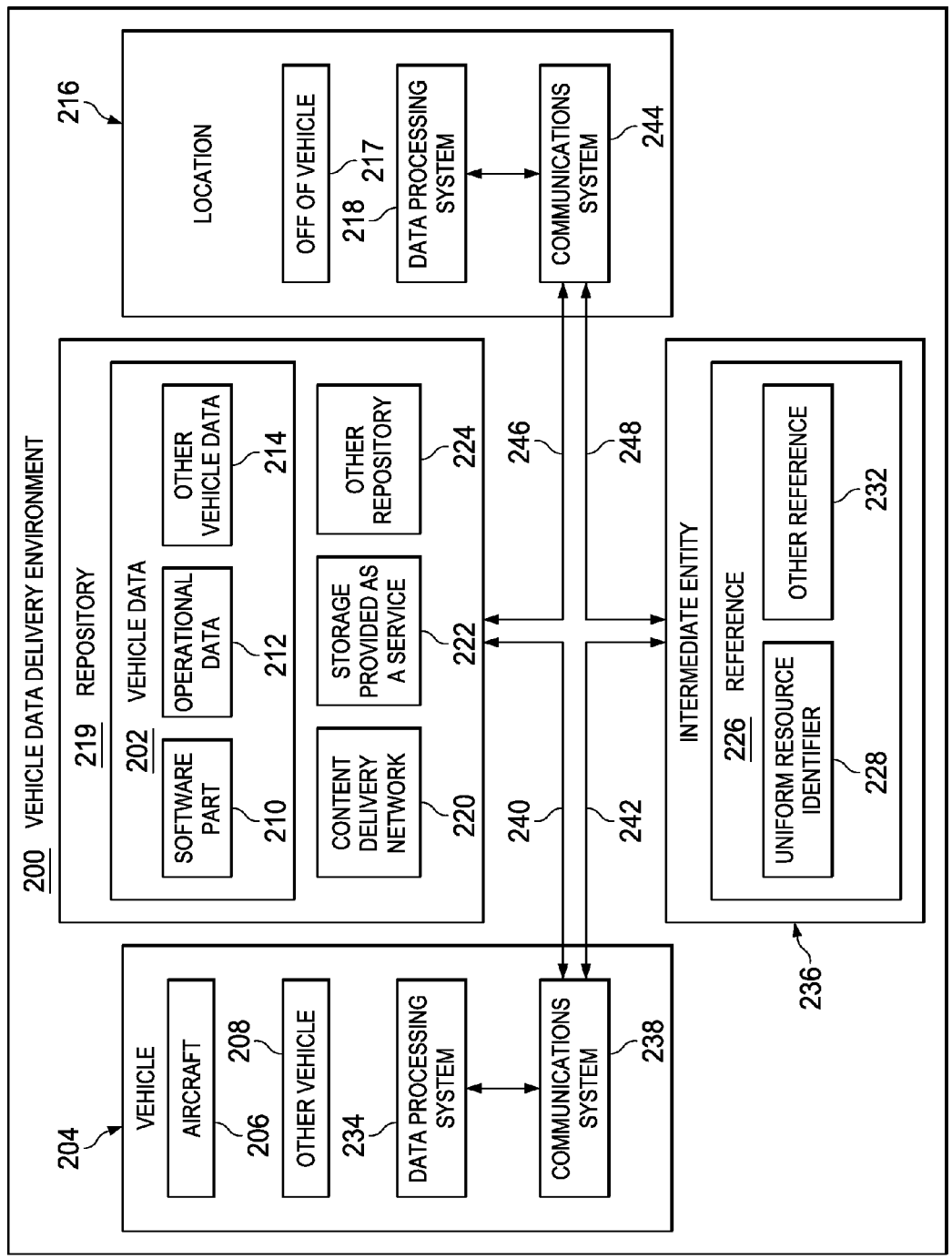
FIG. 2 is an illustration of a block diagram of a vehicle data delivery environment in accordance with an illustrative embodiment.

Turning to FIG. 2, an illustration of a block diagram of a vehicle data delivery environment is depicted in accordance with an illustrative embodiment. Various entities in vehicle data delivery environment 200 for delivering vehicle data 202 to vehicle 204, from vehicle 204, or both to and from vehicle 204 are illustrated in and will be described with reference to FIG. 2. Vehicle data delivery environment 200 is an example of one implementation of an environment in which various types of data may be delivered to aircraft 100, from aircraft 100, or both to and from aircraft 100 at locations 104, 106, 108, and 110 throughout the world 102 in FIG. 1.

Vehicle 204 may be aircraft 206 or other vehicle 208. For example, without limitation, aircraft 206 may be a commercial passenger aircraft, a cargo aircraft, a military aircraft, or any other type of aircraft configured to perform any appropriate task or mission. Aircraft 206 may be a fixed wing aircraft, a rotary wing aircraft, or a lighter-than-air aircraft. Aircraft 206 may be a manned aircraft or an unmanned aircraft. The illustrative embodiments may be used to deliver vehicle data 202 to aircraft 206, from aircraft 206, or both to aircraft 206 and from aircraft 206 when aircraft 206 is on the ground or in flight.

Other vehicle 208 may be any appropriate vehicle other than aircraft 206. For example, without limitation, other vehicle 208 may be configured to perform any appropriate operation in the air, in space, on the surface of water, under water, on the surface of the ground, under the ground, or in any other medium or combination of media.

Vehicle data 202 may comprise any appropriate data for delivery to vehicle 204, delivery from vehicle 204, or both. For example, without limitation, vehicle data 202 may include software part 210, operational data 212, other vehicle data 214, or various combinations of data for delivery to vehicle 204, delivery from vehicle 204, or both.

Software part 210 may comprise software for performing a function on aircraft 206 or other vehicle 208 when software part 210 is loaded and made active on aircraft 206 or other vehicle 208. For example, without limitation, software part 210 may be configured to update, improve, correct, or otherwise change the operation of a number of systems on vehicle 204. Software part 210 is an example of vehicle data 202 for delivery to vehicle 204.

Operational data 212 may include any appropriate data that is generated by or on vehicle 204 when vehicle 204 is in operation. For example, without limitation, operational data 212 may include logs, events, sensor data, other data, or various combinations of data that may be generated by or on aircraft 206 or other vehicle 208. Operational data 212 is an example of vehicle data 202 for delivery from vehicle 204.

Other vehicle data 214 may include vehicle data 202 for delivery to vehicle 204, vehicle data 202 for delivery from vehicle 204, or both. For example, without limitation, software for a system on vehicle 204 in a form other than software part 210 and entertainment media for presentation to passengers by an in-flight entertainment system on aircraft 206 are examples of other vehicle data 214 for delivery to vehicle 204.

Vehicle data 202 may be delivered to vehicle 204 from location 216. In this case, vehicle 204 is the destination for vehicle data 202 and location 216 may be the source of vehicle data 202 for delivery to vehicle 204. Alternatively, or in addition, vehicle data 202 may be delivered from vehicle 204 to location 216. In this case, vehicle 204 is the source of vehicle data 202 and location 216 may be the destination for vehicle data 202 sent from vehicle 204.

Location 216 may include any number of appropriate locations that are not on vehicle 204. Therefore, location 216 may be referred to as off of vehicle 217. Location 216 may comprise a number of physical or other locations.

Location 216 may include data processing system 218. For example, without limitation, data processing system 218 may include a number of data processing systems that may be operated or otherwise controlled by or for a manufacturer of vehicle 204, an operator of vehicle 204, a maintenance entity, or any other appropriate entity or combination of entities that may be responsible for the operation of vehicle 204, the maintenance of vehicle 204, or both. In this case, for example, software part 210 or other vehicle data 214 for delivery to vehicle 204 may be made, stored, or otherwise available at location 216 for delivery of vehicle data 202 to vehicle 204 by data processing system 218. Operational data 212 or other vehicle data 214 sent from vehicle 204 to location 216 may be stored, analyzed, processed, or otherwise used by data processing system 218 at location 216 for any appropriate purpose.

In accordance with an illustrative embodiment, vehicle data 202 is delivered to vehicle 204, from vehicle 204, or both to and from vehicle 204 via repository 219. Repository 219 may comprise any appropriate system or service for the storage or storage and delivery of vehicle data 202 via a network. Repository 219 is not located on vehicle 204. In other words, repository 219 is located off of vehicle 204. Furthermore, vehicle data 202 in repository 219 may not be under the direct or exclusive control of the entity that controls data processing system 218 at location 216. Therefore, repository 219 may be referred to as a third-party repository, system, or service.

Repository 219 may provide for the storage or storage and delivery of vehicle data 202 using cloud computing. Cloud computing is computing that involves a relatively large number of computers connected through a network, such as the Internet. For example, without limitation, repository 219 may comprise content delivery network 220, storage provided as a service 222, other repository 224, or various combinations of appropriate systems and services for the storage or storage and delivery of vehicle data 202 via a network, such as the Internet.

Content delivery network 220 also may be known as a content distribution network. Content delivery network 220 may comprise a relatively large distributed system of servers deployed in multiple data centers across the Internet. Content delivery network 220 may be configured to serve content to end-users with high availability and high performance. An operator of content delivery network 220 may be paid by a content provider for delivering content to end-users.

Storage provided as a service 222 may comprise a service for storing data on the Internet. The provider of storage provided as a service 222 stores data on the Internet for a customer. The customer is able to use the service to store data on the Internet and retrieve stored data from the Internet via an appropriate Internet connection. However, the customer does not control the systems on which the data is stored, and may not know on which systems the data is being stored by the service provider.

Vehicle data 202 in repository 219 is identified by reference 226. Reference 226 may include any information, in any appropriate form, that identifies vehicle data 202 in repository 219 in an appropriate manner such that reference 226 may be used to retrieve vehicle data 202 from repository 219. The form and content of reference 226 may depend on the specific repository 219 in which vehicle data 202 is stored. For example, without limitation, reference 226 may comprise uniform resource identifier 228, other reference 232, or any appropriate combination of reference information identifying vehicle data 202 in repository 219.

Uniform resource identifier 228 may comprise a string of characters used to identify a name of a web resource. Such identification enables interaction with representations of the web resource over a network using specific protocols. Uniform resource identifier 228 may be classified as a uniform resource locator, a uniform resource name, or both.

Vehicle 204 may send vehicle data 202 that is to be delivered from vehicle 204 to location 216 to repository 219. Reference 226 then may be used by data processing system 218 at location 216 to retrieve vehicle data 202 from repository 219. Data processing system 218 at location 216 may send vehicle data 202 to be delivered from location 216 to vehicle 204 to repository 219. Reference 226 then may be used by data processing system 234 on vehicle 204 to retrieve vehicle data 202 from repository 219.

Reference 226 may be sent from vehicle 204 to location 216 when vehicle data 202 is delivered from vehicle 204 to location 216 via repository 219. For example, without limitation, reference 226 may be sent from vehicle 204 to location 216 directly, via intermediate entity 236, via repository 219 along with vehicle data 202, in any other appropriate manner, or in multiple appropriate manners. The retrieval of vehicle data 202 from repository 219 by data processing system 218 at location 216 using reference 226 may be initiated, for example, without limitation, in response to the receiving of reference 226 by data processing system 218 at location 216 or in any other appropriate manner.

Reference 226 may be sent from location 216 to vehicle 204 when vehicle data 202 is delivered from location 216 to vehicle 204 via repository 219. For example, without limitation, reference 226 may be sent from location 216 to vehicle 204 directly, via intermediate entity 236, via repository 219 along with vehicle data 202, in any other appropriate manner, or in multiple appropriate manners. The retrieval of vehicle data 202 from repository 219 by data processing system 234 on vehicle 204 using reference 226 may be initiated, for example, without limitation, in response to the receiving of reference 226 by vehicle 204 or in any other appropriate manner.

Alternatively, reference 226 may be known by data processing system 218 at location 216 before vehicle data 202 for delivery to location 216 is stored in repository 219 by vehicle 204. Reference 226 may be considered to be known by data processing system 218 at location 216 when reference 226 is stored on data processing system 218 at location 216, when reference 226 is stored at location 216 and accessible by data processing system 218 at location 216, or both. Similarly, reference 226 may be known by data processing system 234 on vehicle 204 before vehicle data 202 for delivery to vehicle 204 is stored in repository 219 by data processing system 218 at location 216. Reference 226 may be considered to be known by data processing system 234 on vehicle 204 when reference 226 is stored on data processing system 234 on vehicle 204, when reference 226 is stored on vehicle 204 and accessible by data processing system 234 on vehicle 204, or both.

For example, without limitation, data processing system 234 on vehicle 204 may be configured to deliver vehicle data 202 to location 216 by storing vehicle data 202 in repository 219 in an appropriate prearranged manner such that vehicle data 202 may be retrieved by data processing system 218 at location 216 using reference 226 that is already known by data processing system 218 at location 216 when vehicle data 202 is stored in repository 219 by vehicle 204. In this case, for example, without limitation, data processing system 218 at location 216 may be configured to use such a reference 226 known by data processing system 218 to retrieve vehicle data 202 from repository 219 on a periodic, scheduled, or ad hoc basis. Alternatively, or in addition, the retrieval of vehicle data 202 from repository 219 by data processing system 218 at location 216 using such a reference 226 known by data processing system 218 may be initiated, for example, without limitation, in response to a signal or message from vehicle 204 to location 216, the occurrence of another event, or in any other appropriate manner. A similar process may be used to deliver vehicle data 202 from location 216 to vehicle 204 using reference 226 that is known by data processing system 234 on vehicle 204 before vehicle data 202 for delivery to vehicle 204 is sent to repository 219 by data processing system 218 at location 216.

Intermediate entity 236 may be any number of appropriate entities that may operate any appropriate systems through which reference 226 may be sent from vehicle 204 to location 216, from location 216 to vehicle 204, or both. Intermediate entity 236 may use reference 226 to perform various workflow processes related to vehicle data 202 identified by reference 226. For example, without limitation, intermediate entity 236 may be an entity responsible for the maintenance of aircraft 206. In this case, software part 210 or other vehicle data 214 to be delivered to and installed on aircraft 206 may be stored in repository 219 by an aircraft manufacturer or an operator of aircraft 206. The manufacturer or operator of aircraft 206 may send reference 226 identifying software part 210 or other vehicle data 214 stored in repository 219 from location 216 to aircraft 206 via intermediate entity 236 that is responsible for the maintenance of aircraft 206.

Vehicle 204 may include communications system 238. Communications system 238 may be implemented in any appropriate manner for establishing communications link 240 between vehicle 204 and repository 219. Communications link 240 may be configured for sending vehicle data 202 from vehicle 204 to repository 219, for receiving vehicle data 202 from repository 219 by vehicle 204, or both. Communications system 238 on vehicle 204 also may be implemented in any appropriate manner for establishing communications link 242 for sending reference 226 from vehicle 204, for receiving reference 226 by vehicle 204, or both. Communications link 242 for sending and receiving reference 226 by vehicle 204 may be established between vehicle 204 and intermediate entity 236, directly between vehicle 204 and location 216, or both.

Communications system 244 at location 216 may be implemented in any appropriate manner for establishing communications link 246 between location 216 and repository 219. Communications link 246 may be configured for sending vehicle data 202 from location 216 to repository 219, for receiving vehicle data 202 from repository 219 by data processing system 218 at location 216, or both. Communications system 244 at location 216 also may be implemented in any appropriate manner for establishing communications link 248 for sending reference 226 from location 216, for receiving reference 226 by data processing system 218 at location 216, or both. Communications link 248 for sending and receiving reference 226 by data processing system 218 at location 216 may be established between location 216 and intermediate entity 236, directly between location 216 and vehicle 204, or both. For example, without limitation, reference 226 may be sent via a direct connection between communications system 244 at location 216 and communications system 238 on vehicle 204.

Vehicle data 202 that is sent to and retrieved from repository 219 may include much more data than reference 226. Therefore, it is preferable that communications links 240 and 246 between vehicle 204 and location 216, respectively, and repository 219 may comprise relatively high bandwidths, low latencies, or both, for carrying relatively large amounts of vehicle data 202 to and from repository 219 relatively quickly. Such relatively fast communications may be established for communications links 240 and 246 with repository 219 implemented on the Internet from many locations throughout the world with relative ease. Communications links 242 and 248 for carrying the relatively small amount of data comprising reference 226 may be relatively slower and less efficient, without affecting the overall speed of delivering vehicle data 202 to vehicle 204, from vehicle 204, or both to and from vehicle 204 via repository 219 in accordance with an illustrative embodiment. Communications links 242 and 248 for reference 226 also may include appropriate communications via the Internet.

Communications links 240 and 242 with repository 219 may be established using communications systems 238 and 244, respectively, in any appropriate manner to maximize the speed of communicating vehicle data 202 with repository 219. For example, without limitation, data processing system 234 or communications system 238 on vehicle 204 may be configured to identify the highest available bandwidth for establishing communications link 240 with repository 219 from the current location of vehicle 204. Identifying the highest available bandwidth for communications link 240 may include identifying repository 219 to which communications link 240 with the highest available bandwidth may be established from the current location of vehicle 204. Repository 219 to which communications link 240 with the highest available bandwidth may be established may be referred to as repository 219 that is nearest to the current location of vehicle 204. For example, without limitation, repository 219 that is the nearest to the current location of vehicle 204 may be defined by Domain Name System resolution or in another appropriate manner.

Figure 3:
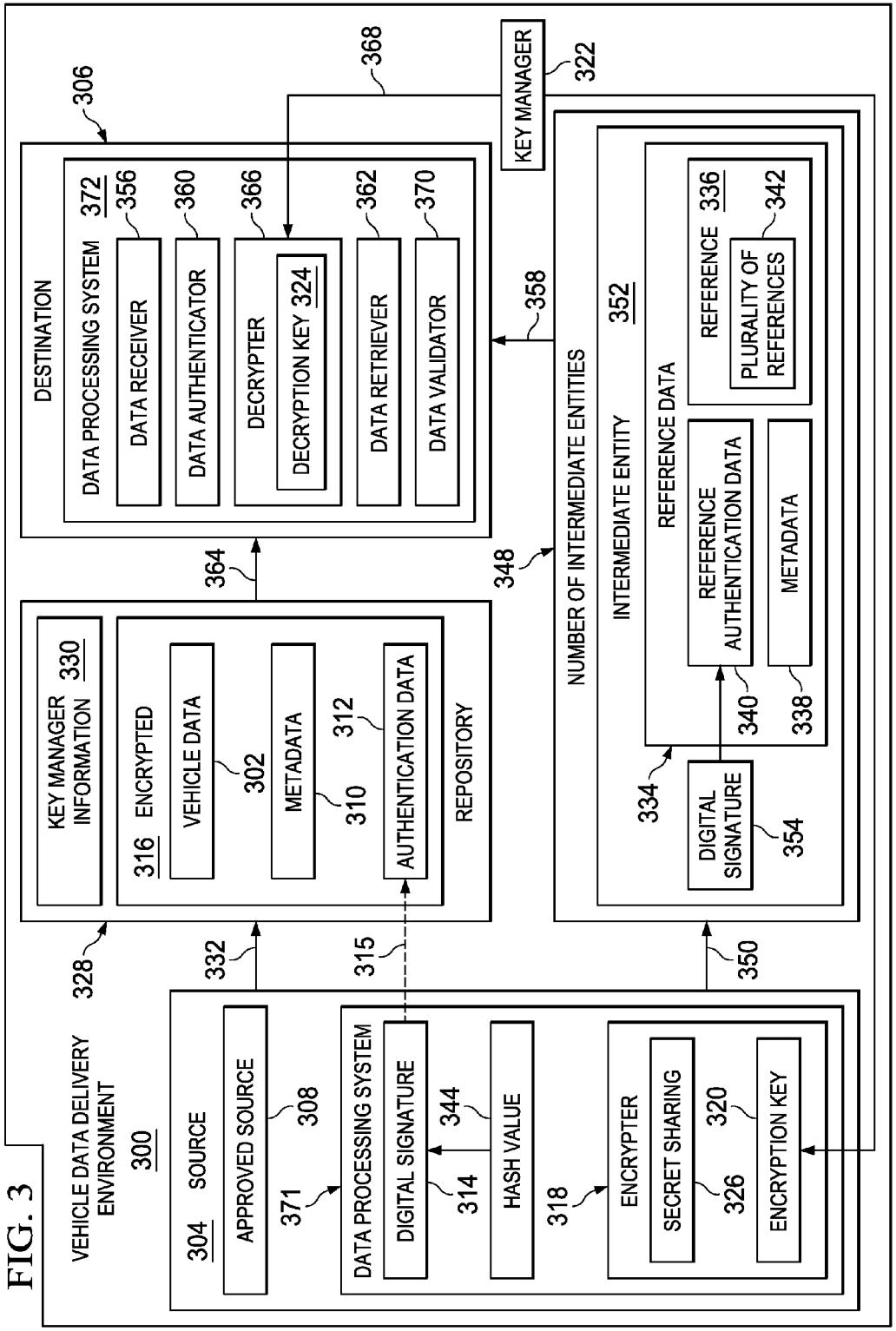
FIG. 3 is an illustration of a block diagram of a vehicle data delivery environment in accordance with an illustrative embodiment.

Turning to FIG. 3, an illustration of a block diagram of a vehicle data delivery environment is depicted in accordance with another illustrative embodiment. Functions performed by various entities in vehicle data delivery environment 300 are illustrated in and will be described with reference to FIG. 3. Vehicle data delivery environment 300 is an example of one implementation of vehicle data delivery environment 200 in FIG. 2.

Vehicle data delivery environment 300 is configured for delivering vehicle data 302 from source 304 to destination 306. Vehicle data 302 may be an example of one implementation of vehicle data 202 in FIG. 2, source 304 may be an example of one implementation of vehicle 204 in FIG. 2, and destination 306 may be an example of one implementation of location 216 in FIG. 2 when vehicle data 202 is delivered from vehicle 204 to location 216 in FIG. 2. Vehicle data 302 may be an example of one implementation of vehicle data 202 in FIG. 2, source 304 may be an example of one implementation of location 216 in FIG. 2, and destination 306 may be an example of one implementation of vehicle 204 in FIG. 2 when vehicle data 202 is delivered from location 216 to vehicle 204 in FIG. 2.

Source 304 may be any appropriate source for vehicle data 302. For example, without limitation, vehicle data 302 may be generated by or for source 304. Source 304 may be approved source 308 for vehicle data 302. Approved source 308 for vehicle data 302 may be any entity, system, or device that is approved to provide vehicle data 302 for destination 306. Destination 306 may be configured to receive or use vehicle data 302 only if vehicle data 302 is from source 304 that is approved source 308 for vehicle data 302.

For example, without limitation, vehicle data 302 may include a software part, operational data, other vehicle data, or various combinations of data to be delivered to or from a vehicle. Vehicle data 302 may include metadata 310. Metadata 310 may include any appropriate information about vehicle data 302. For example, without limitation, when vehicle data 302 includes a software part, metadata 310 may include a part number for the software part, the name of a company or other entity that produced the software part, other appropriate information about the software part, or various combinations of information describing various characteristics of the software part. Metadata 310 may be considered a part of vehicle data 302 or an addition to vehicle data 302. For example, without limitation, metadata 310 may be generated by source 304, added to vehicle data 302 by source 304, or created and added to vehicle data 302 by source 304.

Vehicle data 302 also may include authentication data 312. Authentication data 312 may include any appropriate data identifying source 304 of vehicle data 302. For example, without limitation, authentication data 312 may include digital signature 314 identifying source 304 of vehicle data 302, as indicated by broken line 315. Digital signature 314 for vehicle data 302 may be generated and associated with vehicle data 302 by source 304 in any known and appropriate manner.

Vehicle data 302, including metadata 310, if any, and authentication data 312, may be encrypted 316. Vehicle data 302 may be encrypted 316 by source 304 in any appropriate manner. For example, encrypter 318 may be operated by or for source 304 to encrypt vehicle data 302.

For example, encrypter 318 may be configured to encrypt vehicle data 302 in any known and appropriate manner using encryption key 320. For example, without limitation, encryption key 320 may be a cryptographic key that is provided by key manager 322 for use by encrypter 318 to encrypt vehicle data 302. Key manager 322 may comprise a third party entity or system that is separate from source 304 and destination 306 and that generates and manages the distribution of cryptographic keys for use by source 304 and destination 306. Key manager 322 also may generate and manage the distribution of cryptographic keys for use by entities or systems other than source 304 and destination 306. When vehicle data 302 is encrypted 316 using encryption key 320 provided by key manager 322, destination 306 for vehicle data 302 may need to establish a connection to key manager 322 to obtain decryption key 324 from key manager 322 for decrypting vehicle data 302 at destination 306.

Alternatively, or in addition, encrypter 318 may be configured to encrypt vehicle data 302 using encryption key 320 that is not provided by key manager 322. For example, encrypter 318 may be configured to generate a symmetric key locally and then encrypt with a public key of destination 306. In this case, decryption key 324 for decrypting vehicle data 302 that is encrypted 316 may be derived at destination 306 in a known manner and a connection between destination 306 and key manager 322 will not be needed for decrypting vehicle data 302 at destination 306. However, the use of public keys for encryption of vehicle data 302 by source 304 may be increasingly difficult to manage by source 304 as the number of destinations to which vehicle data 302 may be delivered from source 304 increases. This difficulty may be avoided if key manager 322 is used to provide cryptographic keys for encryption and decryption. In this case, key manager 322 may handle the management of encryption and decryption keys for use by a relatively large number of sources and destinations for vehicle data 302.

As another alternative, vehicle data 302 may be encrypted 316 using a form of secret sharing 326. Secret sharing 326 refers to various methods for distributing a secret amongst a group of participants, each of whom is allocated a share of the secret. The secret can be reconstructed only when a sufficient number, of possibly different types, of shares are combined together. Individual shares are of no use on their own. Encryption by secret sharing 326 may be implemented using various mathematical techniques and approaches known to those skilled in the art. Any appropriate method or scheme for secret sharing 326 may be used to provide for the security of vehicle data 302 in accordance with an illustrative embodiment.

For example, without limitation, secret sharing 326 of vehicle data 302 may include separating vehicle data 302 into a plurality of pieces by encrypter 318. The plurality of separated pieces of vehicle data 302 may be distributed in repository 328. For example, without limitation, the plurality of separated pieces of vehicle data 302 may be distributed in repository 328 by storing the plurality of separated pieces of vehicle data 302 at a plurality of different locations in repository 328. In this case, the plurality of different locations in repository 328 may include various different physical locations, virtual locations, or both.

Methods of encryption that are different from those described as examples herein may be used to encrypt vehicle data 302. Various methods of encryption may be used in combination to encrypt vehicle data 302. For example, without limitation, a method of encryption that uses a combination of cryptographic keys provided by key manager 322 and symmetric or other public keys of destinations for vehicle data 302 may be used by source 304 to encrypt vehicle data 302 in accordance with an illustrative embodiment.

Vehicle data 302, including metadata 310, if any, and authentication data 312, that is encrypted 316 may be stored in repository 328 by source 304. Vehicle data 302 may be encrypted 316 to maintain the confidentiality and integrity of vehicle data 302, including metadata 310, if any, when vehicle data 302 is stored in repository 328 that may not be under the control of an entity that has authority to access vehicle data 302.

Key manager information 330 may be stored by source 304 in repository 328 along with vehicle data 302 when vehicle data 302 is encrypted 316 using encryption key 320 that is provided by key manager 322. Such key manager information 330 may or may not be considered to be part of vehicle data 302 stored in repository 328. Key manager information 330 may be stored in repository 328 along with vehicle data 302 and associated with vehicle data 302 stored in repository 328 by source 304 in any appropriate manner. Key manager information 330 for vehicle data 302 that is stored in repository 328 by source 304 may not be encrypted 316.

Key manager information 330 may include any appropriate information that may be used to retrieve decryption key 324 from key manager 322 for decrypting vehicle data 302. For example, key manager information 330 may include information identifying key manager 322, information identifying decryption key 324 that is generated and managed by key manager 322, or both. For example, without limitation, key manager information 330 may include a uniform resource identifier or other appropriate information for identifying key manager 322. For example, without limitation, key manager information 330 may include a universally unique identifier or other appropriate information for identifying decryption key 324 that is generated and managed by key manager 322.

Repository 328 may be an example of one implementation of repository 219 in FIG. 2. For example, without limitation, repository 328 may comprise a content delivery network, storage provided as a service, or another appropriate repository for storing vehicle data 302, including metadata 310, if any, authentication data 312, and key manager information 330, if any, on the Internet. Repository 328 may include a plurality of repositories. Vehicle data 302, including metadata 310, if any, authentication data 312, and key manager information 330, if any, may be sent from source 304 to repository 328 for storage via communications link 332. For example, without limitation, communications link 332 may include an appropriate connection between source 304 and the Internet.

Reference data 334 includes reference 336. Reference data 334 also may include metadata 338, reference authentication data 340, or both metadata 338 and reference authentication data 340. Reference data 334 may be generated by or for source 304 in any appropriate manner and form.

Reference 336 may be an example of one implementation of reference 226 in FIG. 2. Reference 336 may include any information, in any appropriate form, that identifies vehicle data 302 in repository 328 in an appropriate manner such that reference 336 may be used to retrieve vehicle data 302, including metadata 310, if any, authentication data 312, and key manager information 330, if any, from repository 328. For example, without limitation, reference 336 may comprise a uniform resource identifier, other information, or any appropriate combination of information identifying vehicle data 302 in repository 328.

Reference 336 may include plurality of references 342. For example, without limitation, when vehicle data 302 is encrypted 316 using secret sharing 326, a plurality of separated pieces of vehicle data 302 may be distributed in repository 328. In this case, plurality of references 342 may identify the plurality of separated pieces of vehicle data 302 distributed in repository 328.

Metadata 338 included in reference data 334 may include any appropriate information about reference 336, about vehicle data 302 identified by reference 336, or both. For example, metadata 338 included in reference data 334 may include commands, instructions, or other information for controlling the use of reference 336, vehicle data 302 identified by reference 336, or both. For example, metadata 338 may include information indicating when or how reference 336, vehicle data 302 identified by reference 336, or both, may be used. For example, without limitation, when vehicle data 302 includes a software part for a vehicle, metadata 338 may include information for determining an appropriate time or conditions for using reference 336 to retrieve the software part from repository 328 by the vehicle, instructions for loading the software part on the vehicle, or other appropriate information or various combinations of information regarding retrieving the software part from repository 328, using the software part retrieved from repository 328, or both. Thus, in accordance with an illustrative embodiment, metadata 338 in reference data 334 may be configured to control workflow or work processes involving vehicle data 302 identified by reference data 334.

Alternatively, or in addition, metadata 338 included in reference data 334 may include information for decrypting vehicle data 302 identified by reference 336. For example, without limitation, when vehicle data 302 is encrypted 316 using encryption key 320 provided by key manager 322, some or all of key manager information 330 for retrieving decryption key 324 from key manager 322 for decrypting vehicle data 302 may be included in metadata 338. For example, some or all of key manager information 330 may be included in metadata 338 as part of reference data 334 instead of being stored along with vehicle data 302 in repository 328. Alternatively, some or all of key manager information 330 may be included in metadata 338 as part of reference data 334 and also may be stored along with vehicle data 302 in repository 328. However, it is preferable that all of key manager information 330 is stored along with vehicle data 302 in repository 328.

Alternatively, or in addition, metadata 338 included in reference data 334 may include information that may be used for determining whether vehicle data 302 identified by reference 336 remains unchanged. For example, without limitation, metadata 338 may include hash value 344 for vehicle data 302. Hash value 344 for vehicle data 302 may be determined by or for source 304 in a known manner using an appropriate hash function before vehicle data 302 is stored in repository 328. For example, without limitation, hash value 344 may be determined as part of the process of generating digital signature 314 for identifying source 304 of vehicle data 302. Alternatively, digital signature 314 over hash value 344 may be included in metadata 338 as part of reference data 334 that may be used to determine whether vehicle data 302 is unchanged.

Reference authentication data 340 may include any appropriate data identifying source 304 of reference data 334. Reference authentication data 340 may be generated and associated with reference data 334 by source 304 in any known and appropriate manner. For example, without limitation, reference authentication data 340 may include a digital signature identifying source 304 of reference data 334.

Reference data 334 may be sent directly from source 304 to destination 306 via an appropriate communications link between source 304 and destination 306. Alternatively, reference data 334 may be delivered from source 304 to destination 306 via number of intermediate entities 348. In this case, reference data 334 may be sent from source 304 to one of number of intermediate entities 348 via communications link 350. Communications link 350 may be implemented in any appropriate manner for providing reference data 334 from source 304 to number of intermediate entities 348.

Number of intermediate entities 348 may include any number of appropriate entities that may operate any appropriate systems through which reference data 334 may be sent from source 304 to destination 306. Reference data 334 may be passed between a plurality of intermediate entities in number of intermediate entities 348 in an appropriate sequence as reference data 334 is delivered from source 304 to destination 306 via number of intermediate entities 348. Intermediate entity 352 in number of intermediate entities 348 may be an example of intermediate entity 236 in FIG. 2.

Each intermediate entity in number of intermediate entities 348 through which reference data 334 passes on the way from source 304 to destination 306 may perform a process using reference data 334. For example, before performing a process using reference data 334, intermediate entity 352 may check reference authentication data 340 for reference data 334 in a known manner to determine whether reference data 334 is from an approved source for reference data 334. Intermediate entity 352 may not perform any process using reference data 334 unless the check of reference authentication data 340 indicates that reference data 334 is from an approved source for reference data 334.

Intermediate entity 352 may perform any number of appropriate processes using reference data 334 when reference data 334 is determined to be from an approved source for reference data 334. For example, without limitation, processes performed by intermediate entity 352 using reference data 334 may include viewing reference 336, metadata 338, or both by intermediate entity 352. Reference data 334 may be unpacked by intermediate entity 352 from the form in which reference data 334 is received by intermediate entity 352 before reference data 334 may be viewed or otherwise used by intermediate entity 352. Processes performed by intermediate entity 352 using reference data 334 may or may not change reference data 334. In any case, reference data 334 that was unpacked by intermediate entity 352 may be repacked by intermediate entity 352 into an appropriate form for transmission of reference data 334 to another intermediate entity in number of intermediate entities 348 or to destination 306.

Reference data 334 may be signed by intermediate entity 352 before reference data 334 is delivered by intermediate entity 352 to another intermediate entity in number of intermediate entities 348 or to destination 306. For example, reference data 334 may be signed by intermediate entity 352 using digital signature 354 for intermediate entity 352. Digital signature 354 may be generated by intermediate entity 352 and associated with reference data 334 in any known and appropriate manner. For example, digital signature 354 for intermediate entity 352 may be applied over one or more other digital signatures or other information comprising reference authentication data 340 for reference data 334. Alternatively, digital signature 354 for intermediate entity 352 may replace one or more other digital signatures or other information comprising reference authentication data 340 for reference data 334.

In accordance with an illustrative embodiment, a source of reference data 334 may refer not only to source 304 that originally provided reference data 334 but also to any intermediate entity in number of intermediate entities 348 that may have handled reference data 334 as reference data 334 is delivered from source 304 to destination 306 via number of intermediate entities 348. Therefore, digital signature 354 for intermediate entity 352 as applied to reference data 334 may identify intermediate entity 352 as a source of reference data 334.

Reference data 334 may be received at destination 306 by data receiver 356. For example, data receiver 356 may be configured to receive reference data 334 from source 304 via an appropriate direct communications link between source 304 and destination 306. Alternatively, or in addition, data receiver 356 may be configured to receive reference data 334 from number of intermediate entities 348 via communications link 358. Communications link 358 may be implemented in any appropriate manner for providing reference data 334 from number of intermediate entities 348 to destination 306.

Data authenticator 360 at destination 306 may be configured to determine whether reference data 334 is from an approved source for reference data 334. For example, without limitation, data authenticator 360 may be configured to use reference authentication data 340 for reference data 334 in a known manner to determine whether reference data 334 is from an approved source for reference data 334. Reference data 334 may not be used at destination 306 unless data authenticator 360 determines that reference data 334 is from an approved source for reference data 334.

Data retriever 362 at destination 306 may be configured to use reference 336 from reference data 334 to retrieve vehicle data 302 from repository 328 when reference data 334 is determined to be from an approved source for reference data 334. For example, data retriever 362 may be configured to use reference 336 to retrieve vehicle data 302, including metadata 310, if any, authentication data 312, and key manager information 330, if any, from repository 328 via communications link 364. For example, without limitation, communications link 364 may include an appropriate connection between destination 306 and the Internet.

Decrypter 366 at destination 306 is configured to decrypt vehicle data 302 retrieved from repository 328 that is encrypted 316. For example, without limitation, decrypter 366 may be configured to decrypt vehicle data 302 in a known manner using decryption key 324.

For example, decrypter 366 may be configured to use key manager information 330 to retrieve decryption key 324 from key manager 322 when vehicle data 302 is encrypted 316 using encryption key 320 from key manager 322. Key manager information 330 may be used to retrieve decryption key 324 from key manager 322 in any appropriate manner. Key manager 322 may authenticate the entity that is attempting to retrieve decryption key 324, to confirm whether destination 306 is authorized to receive decryption key 324 from key manager 322, in any appropriate manner. An appropriate connection 368 between destination 306 and key manager 322 may need to be established to retrieve decryption key 324 from key manager 322 by decrypter 366 for decrypting vehicle data 302.

Alternatively, or in addition, decrypter 366 may be configured to derive decryption key 324 for decrypting vehicle data 302 in an appropriate manner at destination 306 when vehicle data 302 is encrypted 316 using encryption key 320 that is not provided by key manager 322. In this case, a connection between destination 306 and key manager 322 will not be needed for decrypting vehicle data 302 at destination 306.

Alternatively, or in addition, decrypter 366 may be configured to use plurality of references 342 in reference data 334 to identify a plurality of separated pieces of vehicle data 302 that may be distributed in repository 328 when vehicle data 302 is encrypted using secret sharing 326. Data retriever 362 may be configured to use plurality of references 342 to retrieve the plurality of separated pieces of vehicle data 302 from repository 328. Decrypter 366 may be configured to combine the retrieved separated pieces of vehicle data 302 in an appropriate manner to decrypt vehicle data 302.

After vehicle data 302 retrieved from repository 328 is decrypted, data authenticator 360 may be used to determine whether vehicle data 302 is from an approved source for vehicle data 302. For example, without limitation, data authenticator 360 may be configured to use authentication data 312 for vehicle data 302 in a known manner to determine whether vehicle data 302 is from an approved source for vehicle data 302. Vehicle data 302 may not be used at destination 306 unless data authenticator 360 determines that vehicle data 302 is from an approved source for vehicle data 302.

Data validator 370 at destination 306 may be configured to determine whether vehicle data 302 retrieved from repository 328 is unchanged. For example, data validator 370 may be configured to use hash value 344 for vehicle data 302 or other appropriate information included in reference data 334 to determine whether vehicle data 302 retrieved from repository 328 is unchanged from the time that reference data 334 for identifying vehicle data 302 stored in repository 328 was generated. For example, without limitation, data validator 370 may be configured to calculate a hash value for vehicle data 302 retrieved from repository 328 using the same hash function that was used to calculate hash value 344 for vehicle data 302 that is included in reference data 334. Data validator 370 then may compare hash value 344 included in reference data 334 with the calculated hash value for vehicle data 302 retrieved from repository 328. If the hash values do not match, vehicle data 302 identified by reference data 334 is determined to have changed after reference data 334 identifying vehicle data 302 stored in repository 328 was generated. Such a change in vehicle data 302 identified by reference data 334 may not be identified by data authenticator 360, for example, if vehicle data 302 stored in repository 328 and identified by reference data 334 was changed by an approved source of vehicle data 302 after reference data 334 was generated.

One or more of encrypter 318, processes for generating vehicle data 302, metadata 310, authentication data 312, and key manager information 330, processes for storing vehicle data 302, metadata 310, authentication data 312, and key manager information 330 in repository 328, and processes for generating reference data 334 may be implemented in data processing system 371 at source 304. For example, without limitation, when source 304 is an aircraft, data processing system 371 may comprise an aircraft network data processing system on the aircraft.

One or more of data receiver 356, data authenticator 360, data retriever 362, decrypter 366, and data validator 370 may be implemented in data processing system 372 at destination 306. Data processing system 372 at destination 306 also may be configured to use vehicle data 302 that is delivered from source 304 to destination 306 via repository 328 in accordance with an illustrative embodiment for any appropriate purpose or various combinations of purposes. For example, without limitation, when destination 306 is an aircraft, data processing system 372 may comprise an aircraft network data processing system on the aircraft.

The illustrations of FIG. 2 and FIG. 3 are not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined, divided, or combined and divided into different blocks when implemented in different illustrative embodiments.

For example, vehicle data 302 that is stored in repository 328 may not be encrypted in some illustrative embodiments. Reference data 334 identifying vehicle data 302 stored in repository 328 may be encrypted for delivery of reference data 334 from source 304 to destination 306 in some illustrative embodiments.

Figure 4:
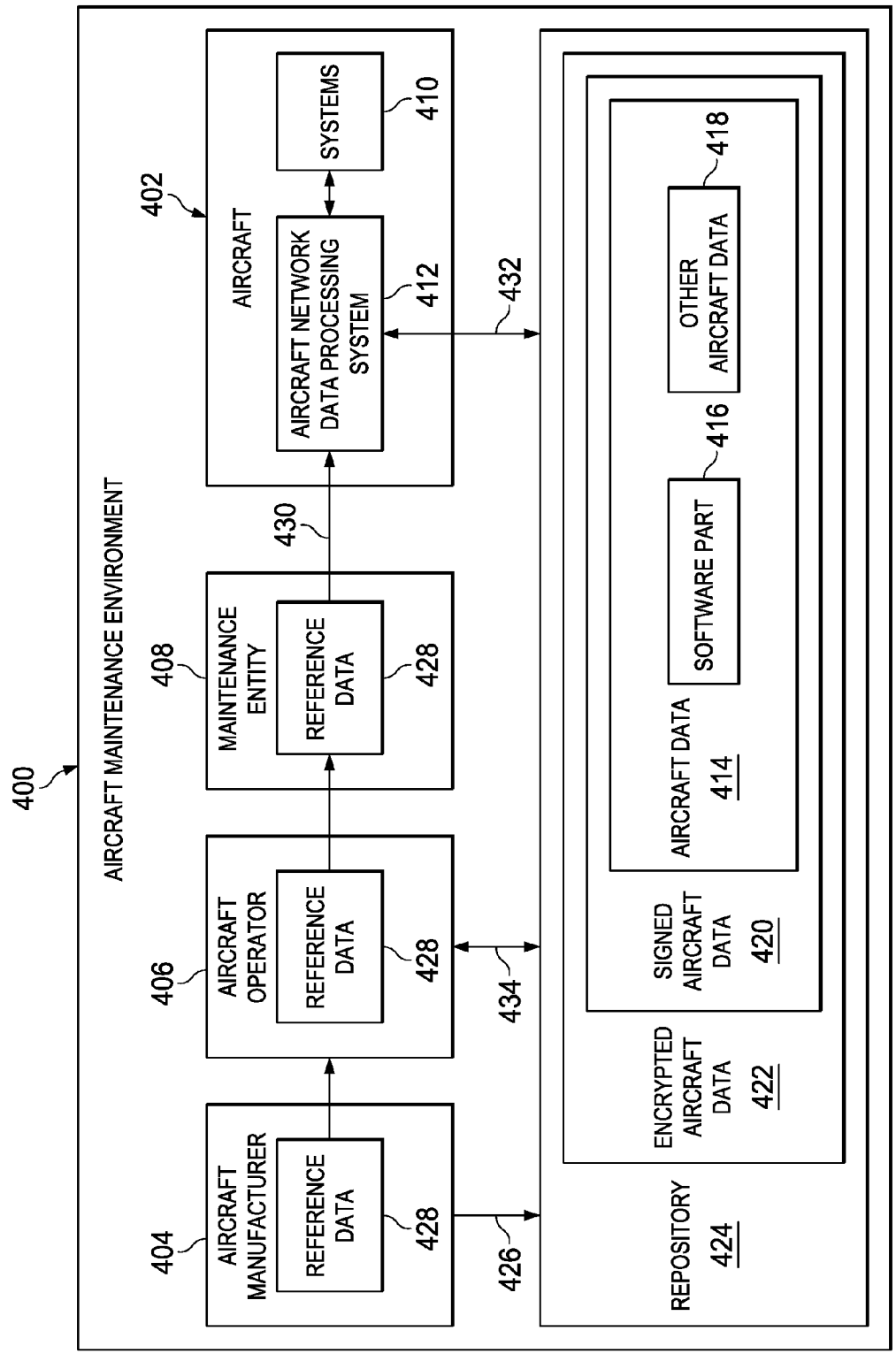
FIG. 4 is an illustration of a block diagram of an aircraft maintenance environment in accordance with an illustrative embodiment.

Turning to FIG. 4, an illustration of a block diagram of an aircraft maintenance environment is depicted in accordance with an illustrative embodiment. Aircraft maintenance environment 400 may be an example of one implementation of vehicle data delivery environment 200 in FIG. 2 and vehicle data delivery environment 300 in FIG. 3. Aircraft maintenance environment 400 may include any appropriate environment for maintaining aircraft 402. Aircraft 402 may be an example of one implementation of aircraft 100 in FIG. 1 and aircraft 206 in FIG. 2.

Aircraft 402 may be made by aircraft manufacturer 404. Aircraft manufacturer 404 may include any appropriate entity for manufacturing aircraft 402.

Aircraft 402 may be operated by aircraft operator 406. For example, aircraft operator 406 may be an airline, a military organization, another government or private entity, or any combination of entities that operates aircraft 402. Aircraft operator 406 may be responsible for and control the maintenance of aircraft 402.

Maintenance operations on aircraft 402 may be performed by maintenance entity 408. For example, maintenance entity 408 may be any appropriate entity that maintains aircraft 402 for aircraft operator 406. For example, without limitation, maintenance entity 408 may be aircraft manufacturer 404, aircraft operator 406, or any other appropriate entity.

Aircraft 402 may include systems 410 for performing various functions on aircraft 402. For example, without limitation, systems 410 on aircraft 402 may include line-replaceable units. Communications between systems 410 on aircraft 402 may be provided by aircraft network data processing system 412 on aircraft 402.

Maintenance of aircraft 402 may include delivering various types of aircraft data 414 to aircraft 402. For example, aircraft data 414 may be delivered to aircraft 402 and loaded on systems 410 to maintain or improve the operation of systems 410 on aircraft 402. For example, without limitation, aircraft data 414 may include software part 416 or other aircraft data 418.

Aircraft operator 406 may be responsible for the loading of aircraft data 414 on aircraft 402. For example, without limitation, software part 416 may be loaded on one or more systems 410 on aircraft 402 by aircraft operator 406 to replace or update a software part that was originally loaded on aircraft 402 by aircraft manufacturer 404. Software part 416 or other aircraft data 418 may be loaded on aircraft 402 by aircraft operator 406 as part of the process of maintaining aircraft 402 by aircraft operator 406.

For example, without limitation, aircraft data 414 to be delivered to aircraft 402 may be provided by aircraft manufacturer 404. In this case, aircraft manufacturer 404 may sign aircraft data 414 with a digital signature to identify aircraft manufacturer 404 as the source of aircraft data 414 in a known manner. Aircraft data 414 that is signed by aircraft manufacturer 404 may be referred to as signed aircraft data 420.

Aircraft manufacturer 404 may encrypt signed aircraft data 420. For example, without limitation, aircraft manufacturer 404 may encrypt signed aircraft data 420 in a known manner using an encryption key that is provided by a key manager, using a symmetric or other public encryption key of aircraft 402, using secret sharing, or using another encryption method or an appropriate combination of various different methods of encrypting data. Signed aircraft data 420 that is encrypted by or for aircraft manufacturer 404 may be referred to as encrypted aircraft data 422.

Encrypted aircraft data 422 may be stored by aircraft manufacturer 404 in repository 424 for delivery to aircraft 402. For example, without limitation, repository 424 may comprise a content delivery network, storage provided as a service on the Internet, or any other appropriate storage service or system that is not on aircraft 402. Encrypted aircraft data 422 may be sent to repository 424 for storage via communications link 426. For example, without limitation, communications link 426 may include an appropriate connection between a data processing system operated by or for aircraft manufacturer 404 and the Internet.

Aircraft manufacturer 404 may generate reference data 428 identifying encrypted aircraft data 422 stored in repository 424. Reference data 428 may include any information for identifying encrypted aircraft data 422 stored in repository 424 in an appropriate manner such that reference data 428 may be used to retrieve encrypted aircraft data 422 from repository 424. For example, without limitation, reference data 428 may include a uniform resource identifier or any other appropriate information identifying encrypted aircraft data 422 stored in repository 424. Aircraft manufacturer 404 may sign reference data 428 with a digital signature to identify aircraft manufacturer 404 as a source of reference data 428 in a known manner.

Aircraft manufacturer 404 may send reference data 428 to aircraft operator 406 in any appropriate manner. Aircraft operator 406 may check the digital signature applied to reference data 428 by aircraft manufacturer 404, to determine in a known manner whether reference data 428 is from an approved source before using reference data 428. Aircraft operator 406 may control the delivery and loading of aircraft data 414 on aircraft 402 by controlling the distribution and use of reference data 428. Aircraft operator 406 may sign reference data 428 with a digital signature to identify aircraft operator 406 as a source of reference data 428 in a known manner. For example, without limitation, aircraft operator 406 may sign reference data 428 over the digital signature applied to reference data 428 by aircraft manufacturer 404.

Alternatively, or in addition, aircraft data 414 to be delivered to aircraft 402 may be provided by aircraft operator 406. In this case, aircraft data 414 may be signed by aircraft operator 406 with a digital signature to identify aircraft operator 406 as the source of aircraft data 414. Optionally, signed aircraft data 420 provided by aircraft operator 406 may be encrypted to provide encrypted aircraft data 422. Signed aircraft data 420 or encrypted aircraft data 422 provided by aircraft operator 406 may be stored by aircraft operator 406 in repository 424 for delivery to aircraft 402. Signed aircraft data 420 or encrypted aircraft data 422 provided by aircraft operator 406 may be sent to repository 424 for storage via communications link 434. For example, without limitation, communications link 434 may include an appropriate connection between a data processing system operated by or for aircraft operator 406 and the Internet. Aircraft operator 406 may generate reference data 428 identifying aircraft data 414 stored in repository 424 by aircraft operator 406. In this case, aircraft operator 406 may sign reference data 428 with a digital signature to identify aircraft operator 406 as the source of reference data 428 in a known manner.

Aircraft operator 406 may send reference data 428 to maintenance entity 408 in any appropriate manner. For example, without limitation, aircraft operator 406 may send reference data 428 to maintenance entity 408 to start the process of loading aircraft data 414 on aircraft 402. Maintenance entity 408 may check the digital signatures applied to reference data 428 to determine in a known manner whether reference data 428 is from an approved source before using reference data 428. Maintenance entity 408 may sign reference data 428 with a digital signature to identify maintenance entity 408 as a source of reference data 428 in a known manner. For example, without limitation, maintenance entity 408 may sign reference data 428 over any digital signatures applied to reference data 428 by aircraft manufacturer 404 and aircraft operator 406.

Maintenance entity 408 may send reference data 428 to aircraft 402 in any appropriate manner. For example, maintenance entity 408 may send reference data 428 to aircraft network data processing system 412 via communications link 430. Any appropriate apparatus and method may be used by maintenance entity 408 to establish communications link 430 and deliver reference data 428 to aircraft network data processing system 412. For example, without limitation, maintenance entity 408 may use an appropriate maintenance device or proxy server to deliver reference data 428 to aircraft network data processing system 412.

Aircraft network data processing system 412 may be configured to receive reference data 428 and to check the digital signatures applied to reference data 428 to determine in a known manner whether reference data 428 is from an approved source before using reference data 428. Aircraft network data processing system 412 may be configured to use reference data 428 to retrieve encrypted aircraft data 422 from repository 424 when reference data 428 is determined to be from an approved source. For example, aircraft network data processing system 412 may be configured to establish communications link 432 to repository 424 and to retrieve encrypted aircraft data 422 from repository 424 via communications link 432. For example, without limitation, communications link 432 may include an appropriate connection between aircraft 402 and the Internet.

Aircraft network data processing system 412 may be configured to decrypt encrypted aircraft data 422 retrieved from repository 424 and to check the digital signature applied to aircraft data 414 to determine in a known manner whether aircraft data 414 is from an approved source before aircraft data 414 may be used on aircraft 402. Aircraft data 414 retrieved from repository 424 may be loaded and made active on systems 410 or otherwise used on aircraft 402 when aircraft data 414 is determined to be from an approved source.

Aircraft data 414 may be delivered from aircraft 402 to aircraft operator 406 or another appropriate entity via repository 424. In this case, aircraft data 414 may include aircraft operational data or other data generated on aircraft 402. Aircraft network data processing system 412 may be configured to sign aircraft data 414 generated on aircraft 402 with a digital signature to identify aircraft 402 as the source of aircraft data 414.

Optionally, aircraft network data processing system 412 may be configured to encrypt the aircraft data 414 generated on aircraft 402. Signed aircraft data 420 or encrypted aircraft data 422 generated on aircraft 402 may be sent from aircraft 402 to repository 424 via communications link 432. Aircraft operator 406 may retrieve aircraft data 414 generated on aircraft 402 from repository 424 when desired. Aircraft operator 406 may decrypt aircraft data 414 retrieved from repository 424, if necessary, and check the digital signature applied to aircraft data 414 by aircraft 402 to confirm the source of aircraft data 414 retrieved from repository 424 in a known manner.

Figure 5:
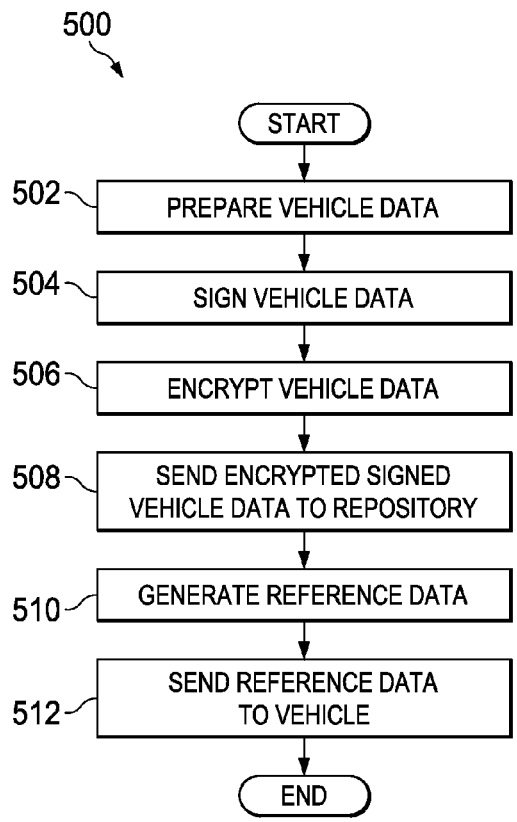
FIG. 5 is an illustration of a flowchart of a process for sending data to a vehicle in accordance with an illustrative embodiment.

Turning to FIG. 5, an illustration of a flowchart of a process for sending data to a vehicle is depicted in accordance with an illustrative embodiment. For example, without limitation, process 500 may be implemented in vehicle data delivery environment 200 to deliver vehicle data 202 to vehicle 204 in FIG. 2. For example, without limitation, process 500 may be implemented at source 304 of vehicle data 302 in vehicle data delivery environment 300 in FIG. 3.

Process 500 begins with preparing the data to be delivered to a vehicle (operation 502). For example, without limitation, operation 502 may include providing a software part or other vehicle data for delivery to the vehicle. The vehicle data may be signed with a digital signature to identify the source of the vehicle data in a known manner (operation 504). The signed vehicle data then may be encrypted (operation 506). For example, without limitation, the vehicle data may be encrypted in a known manner using an encryption key that is provided by a key manager, using a symmetric or other public encryption key of the vehicle, using secret sharing, or using another encryption method or an appropriate combination of various different methods of encrypting data.

The signed and encrypted vehicle data then may be sent to a repository that is not on the vehicle (operation 508). For example, without limitation, the repository may comprise a content delivery network, storage provided as a service on the Internet, or any other appropriate storage service or system that is not on the vehicle.

Reference data identifying the data stored in the repository is generated (operation 510). The reference data may include any information for identifying the vehicle data stored in the repository in an appropriate manner such that the reference data may be used to retrieve the vehicle data from the repository. Operation 510 may include signing the reference data with a digital signature to identify the source of the reference data. The reference data then may be sent to the vehicle (operation 512), with the process terminating thereafter. The reference data may be sent to the vehicle directly or via a number of intermediate entities.

Figure 6:
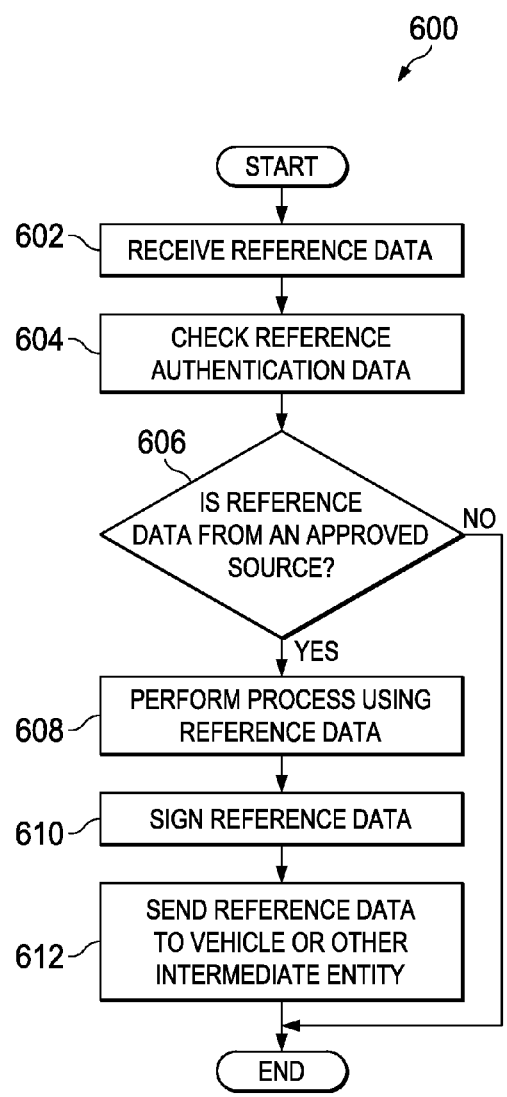
FIG. 6 is an illustration of a flowchart of a process for using reference data by an intermediate entity in accordance with an illustrative embodiment.

Turning to FIG. 6, an illustration of a flowchart of a process for using reference data by an intermediate entity is depicted in accordance with an illustrative embodiment. Process 600 may be implemented, for example, by intermediate entity 236 in vehicle data delivery environment 200 in FIG. 2 or by intermediate entity 352 in vehicle data delivery environment 300 in FIG. 3.

Process 600 may begin by receiving reference data by the intermediate entity (operation 602). For example, the reference data may be received from a source of the reference data or from another intermediate entity. Reference authentication data for the received reference data then may be checked (operation 604) to determine whether the reference data is from an approved source for the reference data (operation 606). For example, operation 604 may include checking a digital signature for the reference data in a known manner. The intermediate entity may not perform any process using the reference data when it is determined at operation 606 that the reference data is not from an approved source for the reference data. In this case, the process terminates.

The intermediate entity may perform a process using the reference data (operation 608) in response to a determination that the reference data is from an approved source for the reference data. The intermediate entity may perform any number of appropriate processes using the reference data. The processes performed by the intermediate entity may or may not change the reference data. In any case, the reference data may be signed by the intermediate entity (operation 610). For example, without limitation, a digital signature for the intermediate entity may be applied over one or more other digital signatures or other information comprising the reference authentication data for the reference data. The intermediate entity then may send the signed reference data to a vehicle or other intermediate entity (operation 612), with the process terminating thereafter.

Figure 7:
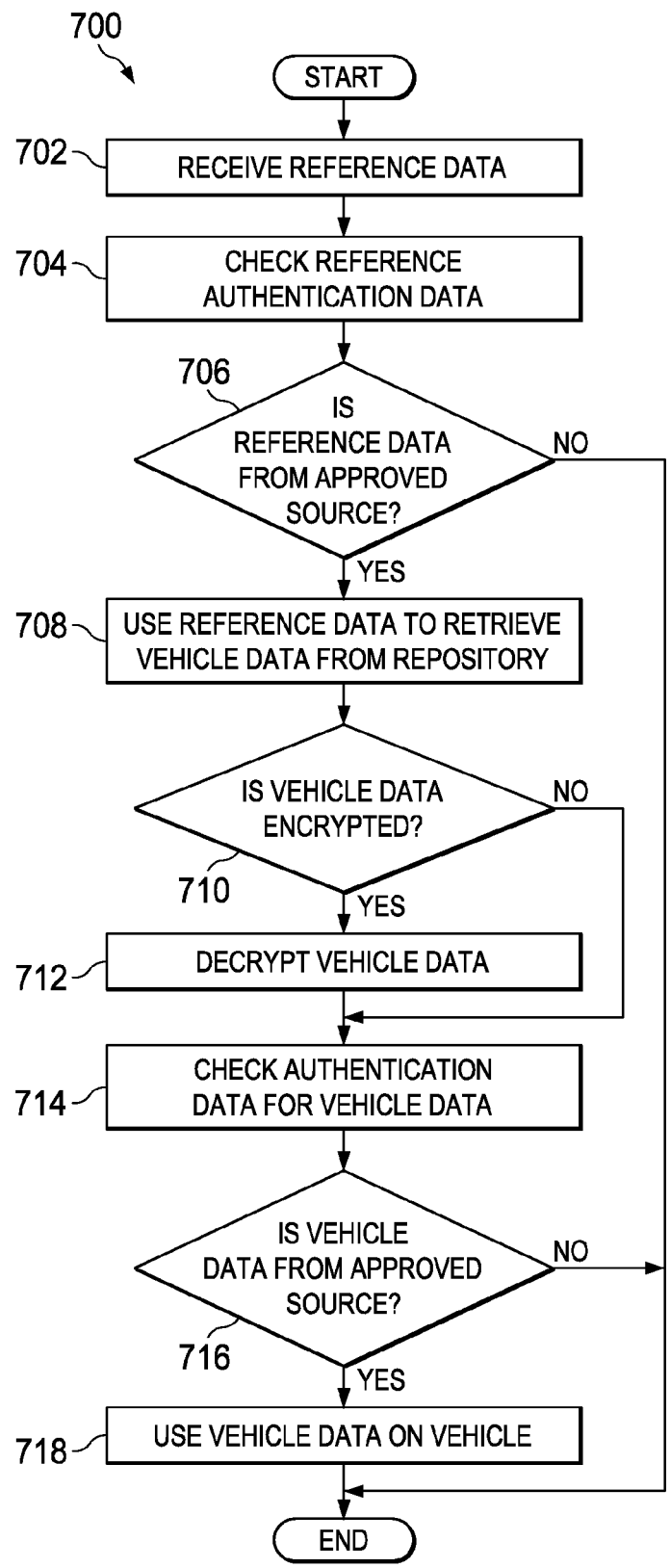
FIG. 7 is an illustration of a flowchart of a process for receiving data by a vehicle in accordance with an illustrative embodiment.

Turning to FIG. 7, an illustration of a flowchart of a process for receiving data by a vehicle is depicted in accordance with an illustrative embodiment. Process 700 may be implemented, for example, by data processing system 234 on vehicle 204 in FIG. 2 or in data processing system 372 at destination 306 for vehicle data 302 in FIG. 3.

Process 700 may begin by receiving reference data identifying vehicle data stored in a repository that is not on the vehicle (operation 702). Reference authentication data for the reference data may be checked (operation 704) to determine whether the reference data is from an approved source for the reference data (operation 706). For example, operation 704 may include checking a digital signature for the reference data in a known manner. The process may terminate when it is determined at operation 706 that the reference data is not from an approved source.

The reference data may be used to retrieve the vehicle data from the repository (operation 708) when it is determined that the reference data is from an approved source for the reference data. For example, without limitation, operation 708 may include retrieving the vehicle data from the repository via a connection between the vehicle and the Internet. It may be determined whether the vehicle data retrieved from the repository is encrypted (operation 710). When it is determined that the vehicle data is encrypted, the vehicle data may be decrypted (operation 712). For example, without limitation, operation 712 may include retrieving a decryption key from a key manager for decrypting the vehicle data.

When it is determined at operation 710 that the vehicle data retrieved from the repository is not encrypted, or after the vehicle data retrieved from the repository is decrypted at operation 712, authentication data for the vehicle data retrieved from the repository may be checked (operation 714) to determine whether the vehicle data is from an approved source for the vehicle data (operation 716). For example, operation 714 may include checking a digital signature for the vehicle data in a known manner. The vehicle data may not be used on the vehicle when it is determined at operation 716 that the vehicle data retrieved from the repository is not from an approved source. In this case, the process may terminate. Otherwise, when it is determined at operation 716 that the vehicle data is from an approved source, the vehicle data may be used on the vehicle (operation 718), with the process terminating thereafter. For example, without limitation, operation 718 may include loading the vehicle data on the vehicle.

Figure 8:
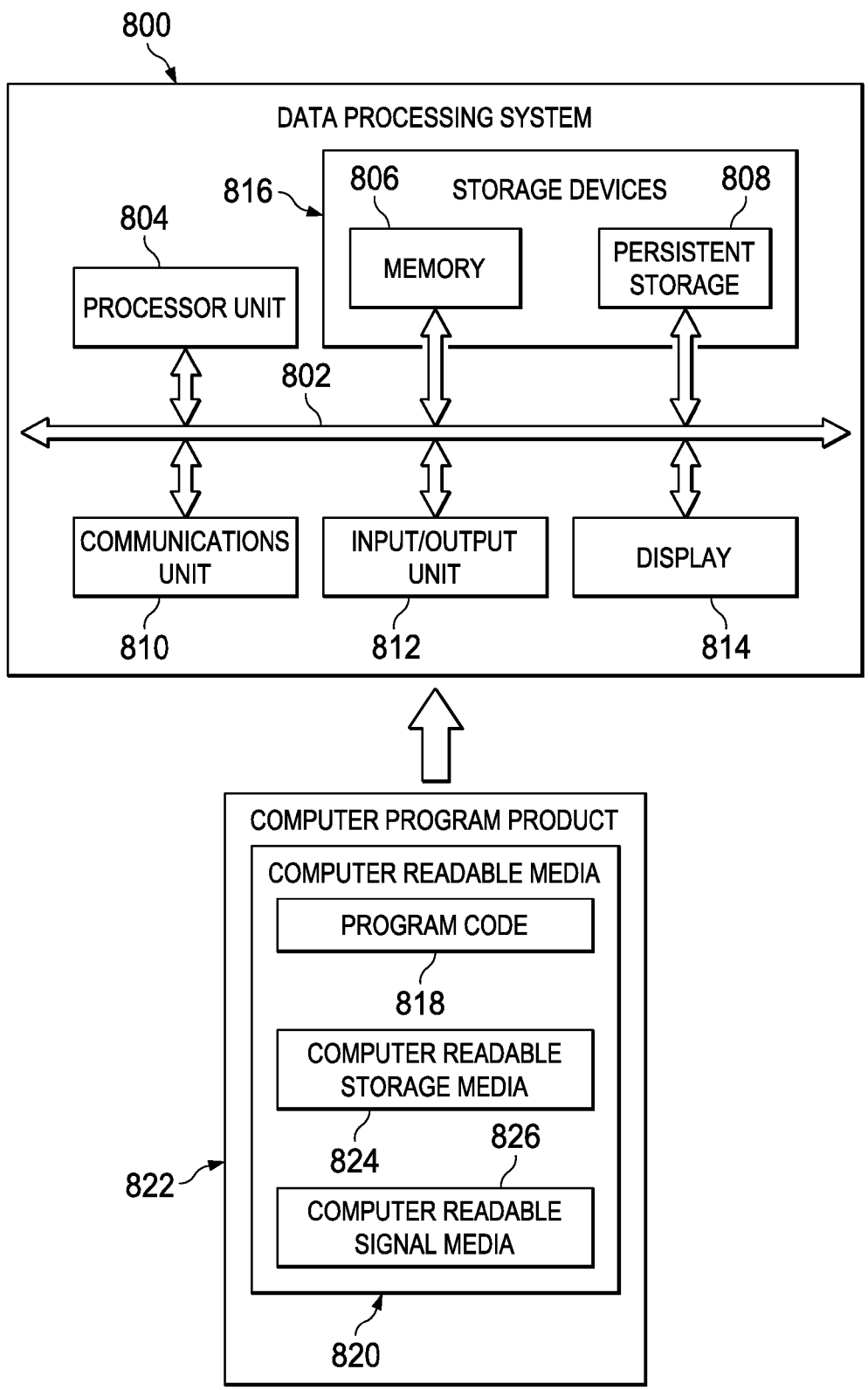
FIG. 8 is an illustration of a block diagram of a data processing system in accordance with an illustrative embodiment.

Turning to FIG. 8, an illustration of a block diagram of a data processing system is depicted in accordance with an illustrative embodiment. Data processing system 800 may be an example of one implementation of data processing system 234 on vehicle 204 or data processing system 218 at location 216 in FIG. 2. Data processing system 800 may be an example of one implementation of data processing system 371 at source 304 or data processing system 372 at destination 306 in FIG. 3.

In this illustrative example, data processing system 800 includes communications fabric 802. Communications fabric 802 provides communications between processor unit 804, memory 806, persistent storage 808, communications unit 810, input/output (I/O) unit 812, and display 814.

Processor unit 804 serves to execute instructions for software that may be loaded into memory 806. Processor unit 804 may be a number of processors, a multi-processor core, or some other type of processor, depending on the particular implementation. A number, as used herein with reference to an item, means one or more items. Further, processor unit 804 may be implemented using a number of heterogeneous processor systems in which a main processor is present with secondary processors on a single chip. As another illustrative example, processor unit 804 may be a symmetric multi-processor system containing multiple processors of the same type.

Memory 806 and persistent storage 808 are examples of storage devices 816. A storage device is any piece of hardware that is capable of storing information, such as, for example, without limitation, data, program code in functional form, and/or other suitable information either on a temporary basis and/or a permanent basis. Storage devices 816 may also be referred to as computer readable storage devices in these examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these examples, provides for communications with other data processing systems or devices. In these examples, communications unit 810 is a network interface card. Communications unit 810 may provide communications through the use of either or both physical and wireless communications links.

Input/output unit 812 allows for input and output of data with other devices that may be connected to data processing system 800. For example, input/output unit 812 may provide a connection for user input through a keyboard, a mouse, and/or some other suitable input device. Further, input/output unit 812 may send output to a printer. Display 814 provides a mechanism to display information to a user.

Instructions for the operating system, applications, and/or programs may be located in storage devices 816, which are in communication with processor unit 804 through communications fabric 802. In these illustrative examples, the instructions are in a functional form on persistent storage 808. These instructions may be loaded into memory 806 for execution by processor unit 804. The processes of the different embodiments may be performed by processor unit 804 using computer-implemented instructions, which may be located in a memory, such as memory 806.

These instructions are referred to as program instructions, program code, computer usable program code, or computer readable program code that may be read and executed by a processor in processor unit 804. The program code in the different embodiments may be embodied on different physical or computer readable storage media, such as memory 806 or persistent storage 808.

Program code 818 is located in a functional form on computer readable media 820 that is selectively removable and may be loaded onto or transferred to data processing system 800 for execution by processor unit 804. Program code 818 and computer readable media 820 form computer program product 822 in these examples. In one example, computer readable media 820 may be computer readable storage media 824 or computer readable signal media 826.

Computer readable storage media 824 may include, for example, an optical or magnetic disk that is inserted or placed into a drive or other device that is part of persistent storage 808 for transfer onto a storage device, such as a hard drive, that is part of persistent storage 808. Computer readable storage media 824 also may take the form of a persistent storage, such as a hard drive, a thumb drive, or a flash memory, that is connected to data processing system 800. In some instances, computer readable storage media 824 may not be removable from data processing system 800.

In these examples, computer readable storage media 824 is a physical or tangible storage device used to store program code 818 rather than a medium that propagates or transmits program code 818. Computer readable storage media 824 is also referred to as a computer readable tangible storage device or a computer readable physical storage device. In other words, computer readable storage media 824 is a media that can be touched by a person.

Alternatively, program code 818 may be transferred to data processing system 800 using computer readable signal media 826. Computer readable signal media 826 may be, for example, a propagated data signal containing program code 818. For example, computer readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 818 may be downloaded over a network to persistent storage 808 from another device or data processing system through computer readable signal media 826 for use within data processing system 800. For instance, program code stored in a computer readable storage medium in a server data processing system may be downloaded over a network from the server to data processing system 800. The data processing system providing program code 818 may be a server computer, a client computer, or some other device capable of storing and transmitting program code 818.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 804 may take the form of a hardware unit that has circuits that are manufactured or configured for a particular use. This type of hardware may perform operations without needing program code to be loaded into a memory from a storage device to be configured to perform the operations.

For example, when processor unit 804 takes the form of a hardware unit, processor unit 804 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 818 may be omitted, because the processes for the different embodiments are implemented in a hardware unit.

In still another illustrative example, processor unit 804 may be implemented using a combination of processors found in computers and hardware units. Processor unit 804 may have a number of hardware units and a number of processors that are configured to run program code 818. With this depicted example, some of the processes may be implemented in the number of hardware units, while other processes may be implemented in the number of processors.

In another example, a bus system may be used to implement communications fabric 802 and may be comprised of one or more buses, such as a system bus or an input/output bus. Of course, the bus system may be implemented using any suitable type of architecture that provides for a transfer of data between different components or devices attached to the bus system.

Additionally, communications unit 810 may include a number of devices that transmit data, receive data, or transmit and receive data. Communications unit 810 may be, for example, a modem or a network adapter, two network adapters, or some combination thereof. Further, a memory may be, for example, memory 806, or a cache, such as found in an interface and memory controller hub that may be present in communications fabric 802.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, a portion of an operation or step, some combination thereof.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of delivering vehicle data, comprising:
   receiving, by a data processing system, reference data comprising a reference identifying the vehicle data stored in a repository that is located off of a vehicle and a hash value for the vehicle data, and reference authentication data identifying a source of the reference data;
   determining, by the data processing system, whether the reference data is from an approved source for the reference data using the reference authentication data;
   retrieving, by the data processing system, the vehicle data from the repository using the reference when the reference data is determined to be from the approved source for the reference data, wherein the vehicle data comprises authentication data identifying a source of the vehicle data;
   determining, by the data processing system, whether the vehicle data is from an approved source for the vehicle data using the authentication data; and
   using the hash value, by the data processing system, to determine whether the vehicle data retrieved from the repository is unchanged from when the reference data was generated.

2. The method of claim 1, wherein the vehicle data retrieved from the repository is encrypted and further comprising at least one of:
   decrypting the vehicle data using a decryption key from a key manager, wherein the decryption key is retrieved from the key manager using key manager information identifying the key manager and the decryption key, and wherein the key manager information is included with at least one of the reference data and the vehicle data retrieved from the repository;
   decrypting the vehicle data using a decryption key that is derived by the data processing system; and
   combining a plurality of separated pieces of the vehicle data that are distributed in the repository, wherein the reference data comprises a plurality of references identifying the plurality of separated pieces of the vehicle data distributed in the repository.

3. The method of claim 1, wherein:
   the repository is selected from a content delivery network and storage provided as a service on the Internet.

4. The method of claim 1, wherein the reference comprises a uniform resource identifier.

5. The method of claim 1, wherein:
   the vehicle data comprises aircraft data for delivery to an aircraft;
   the authentication data comprises a digital signature identifying the source of the vehicle data;
   the vehicle comprises the aircraft; and
   the data processing system comprises an aircraft network data processing system on the aircraft.

6. The method of claim 1, wherein:
   the vehicle data comprises aircraft data for delivery from an aircraft; and
   the authentication data comprises a digital signature identifying the aircraft as the source of the vehicle data.

7. An apparatus, comprising:
   a data receiver comprising hardware on a vehicle configured to receive reference data comprising a reference identifying vehicle data stored in a repository that is located off of the vehicle and a hash value for the vehicle data, and reference authentication data identifying a source of the reference data;
   a data retriever comprising the hardware on the vehicle configured to retrieve the vehicle data from the repository using the reference, wherein the vehicle data comprises authentication data identifying a source of the vehicle data;
   a data authenticator comprising the hardware on the vehicle configured to use the reference authentication data to determine whether the reference data is from an approved source for the reference data and to use the authentication data to determine whether the vehicle data is from an approved source for the vehicle data;
   a decrypter comprising the hardware on the vehicle configured to decrypt the vehicle data retrieved from the repository; and
   a data validator comprising the hardware on the vehicle configured to use the hash value to determine whether the vehicle data retrieved from the repository is unchanged from when the reference data was generated.

8. The apparatus of claim 7, wherein the decrypter is configured to decrypt the vehicle data by at least one of:

decrypting the vehicle data using a decryption key retrieved from a key manager using key manager information included with at least one of the reference data and the vehicle data retrieved from the repository, wherein the key manager information identifies the key manager and the decryption key;

decrypting the vehicle data using a decryption key for the vehicle that is derived by the decrypter on the vehicle; and combining a plurality of separated pieces of the vehicle data that are distributed in the repository, wherein the reference data comprises a plurality of references identifying the plurality of separated pieces of the vehicle data distributed in the repository.

9. The apparatus of claim 7, wherein:
the repository is selected from a content delivery network and storage provided as a service on the Internet.

10. The apparatus of claim 7, wherein the reference comprises a uniform resource identifier.

11. The apparatus of claim 7, wherein:
the vehicle data comprises aircraft data for delivery to an aircraft; and
the vehicle comprises the aircraft.

12. The apparatus of claim 11, wherein the vehicle data comprises a software part for the aircraft.

13. A method of delivering aircraft data, comprising:
receiving, by a data processing system, reference data comprising a reference identifying the aircraft data stored in a repository that is located off of an aircraft and a hash value for the aircraft data, and reference authentication data identifying a source of the reference data;

determining, by the data processing system, whether the reference data is from an approved source for the reference data using the reference authentication data;

retrieving, by the data processing system, the aircraft data from the repository using the reference when the reference data is determined to be from the approved source for the reference data, wherein the aircraft data comprises authentication data identifying a source of the aircraft data;

determining, by the data processing system, whether the aircraft data is from an approved source for the aircraft data using the authentication data; and using the hash value, by the data processing system, to determine whether the aircraft data retrieved from the repository is unchanged from when the reference data was generated;

wherein the aircraft data is signed by the source of the aircraft data with a digital signature identifying the source of the aircraft data to provide signed aircraft data;

wherein the signed aircraft data is encrypted to provide encrypted aircraft data; and wherein the aircraft data stored in the repository that is located off of the aircraft comprises the encrypted aircraft data stored in the repository selected from a content delivery network and storage provided as a service on the Internet.

14. The method of claim 13, wherein the signed aircraft data is encrypted by at least one of:
encrypting the signed aircraft data using an encryption key provided by a key manager;
encrypting the signed aircraft data using an encryption key for a destination of the aircraft data; and
distributing a plurality of separated pieces of the signed aircraft data in the repository, wherein the reference data comprises a plurality of references identifying the plurality of separated pieces of the aircraft data distributed in the repository.

15. The method of claim 13, further comprising:
sending the reference data from the source of the aircraft data to an intermediate entity;
signing the reference data by the intermediate entity with a digital signature identifying the intermediate entity to provide signed reference data; and
sending the signed reference data from the intermediate entity to a destination for the aircraft data.

16. The method of claim 15, wherein the aircraft data comprises aircraft data for delivery to an aircraft, the destination for the aircraft data comprises the aircraft, and further comprising retrieving the aircraft data from the repository by the aircraft using the reference data.

17. The method of claim 16, wherein the aircraft data comprises a software part for the aircraft.

18. The method of claim 13, wherein the aircraft data comprises aircraft data for delivery from an aircraft, the source of the aircraft data comprises the aircraft, and further comprising retrieving the aircraft data from the repository by an operator of the aircraft using the reference data.

* * * * *